Aug. 7, 1923.

J. H. WITTMANN

LUGGAGE CARRIER FOR MOTOR VEHICLES

Filed April 10, 1922

1,463,991

INVENTOR
Joseph H. Wittmann
BY
ATTORNEY

Patented Aug. 7, 1923.

1,463,991

UNITED STATES PATENT OFFICE.

JOSEPH H. WITTMANN, OF KANSAS CITY, MISSOURI.

LUGGAGE CARRIER FOR MOTOR VEHICLES.

Application filed April 10, 1922. Serial No. 550,953.

*To all whom it may concern:*

Be it known that I, JOSEPH H. WITTMANN, a citizen of the United States, residing at Kansas City, in the county of Jackson and State of Missouri, have invented certain new and useful Improvements in Luggage Carriers for Motor Vehicles; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a luggage carrier for motor vehicles and the primary object thereof is to provide an inexpensive, easily applied luggage carrier which may be conveniently attached to the front ends of the side bars of the vehicle frame so that the luggage will be carried in front of the vehicle where it will not be subjected to the accumulation of excessive amounts of dust, as is the case where the luggage carrier is in rear of the vehicle.

Another advantage in securing the luggage carrier to the front of the vehicle is that it may be observed by the driver so that liability of the contents being lost will be reduced.

In actual practice I prefer to arrange the luggage carrier so that it may also serve as a buffer.

The novel details of construction of the invention as well as the advantages thereof will be clearly appreciated as the nature of the invention is better understood by reference to the following description in connection with the accompanying drawings, in which—

Figure 1:
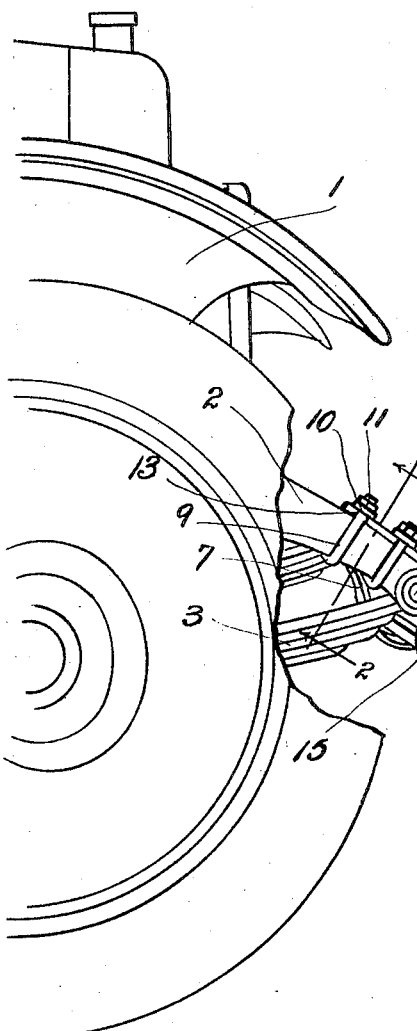
Fig. 1 is a fragmentary view of the front end of a motor vehicle to which my invention is applied.
Figure 3:
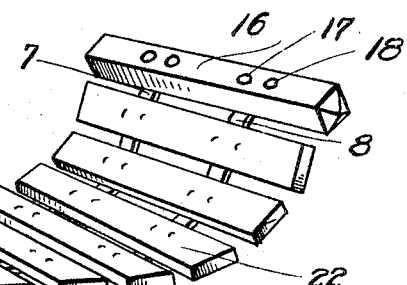
Fig. 3 is a cross sectional view through one of the supporting arms and the end of the buffer bar.

Referring now to the drawings by numerals of reference:

1 designates a motor vehicle provided with the usual side bars 2 of the chassis to which are fastened the usual springs 3, the construction of the motor vehicle conforming to conventional ideas. The side bars 2 are usually channels having top flanges 4 and bottom flanges 5 and they are generally connected to the springs 3 by shackles 6.

Figure 2:
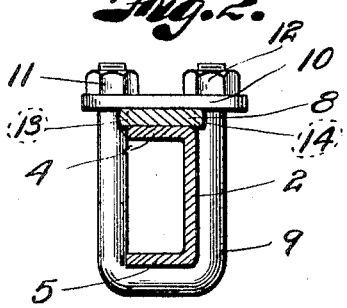
Fig. 2 is a cross sectional view on the line 2—2 of Fig. 1, looking in the direction of the arrow.

Supported by the forward ends of the side bars are two forwardly disposed spring arms 7 and 8, the rear ends lying upon the flanges 4 and secured thereto by shackles shown as U-bolts 9, having shackle plates 10 through which the ends of the U-bolts project, the clamping effect of the plates 10 resulting from the application of the nuts 11 and 12, as will be well understood by reference to Fig. 2.

Figure 4:
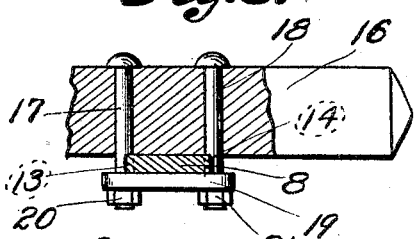
Fig. 4 is a detail fragmentary end view of one of the supporting arms.
Figure 4:
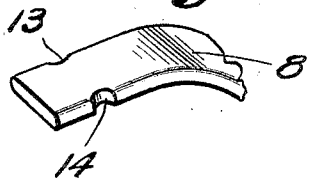

I prefer to apply a plurality of U-bolts or shackles to the rear ends of the arms 7 and 8 and in order to more securely fasten the arms to the front side bars 2 I prefer to notch the arms, as at 13 and 14, to receive the arms of the U-bolt, as will be apparent by reference to Figs. 2 and 4. The arms lie flat upon the flanges 4 for a portion of their lengths and then curve downwardly, as at 15, and extend forwardly and upwardly, carrying at their extreme front ends a buffer bar 16, which may be secured to the front ends by the bolts 17 and 18, which engage notches similar to 13 and 14, the arms being clamped between the bar and the clamping plates 19, held to the bolts 17 and 18 by the nuts 20 and 21.

The arms carry transverse slats 22, which constitute the floor of the luggage carrier and they are fastened to the arms 7 and 8 in substantially the same manner as is the bar 16, although in the case of the slats, the bolts 17 and 18 will not be quite so long.

The arms 7 and 8 are preferably constructed of spring metal so that in the event that the bar 16 comes into contact with an obstruction, the arms will have sufficient inherent resiliency to absorb the shock or at least the major portion of the shock before the blow can be communicated to the vehicle.

The spring arms also yieldingly support the load, that is, the luggage, so that in passing over uneven road beds, the luggage will not be subjected to excessive shocks or jars.

Since the luggage carrier can be conveniently attached to the front of the vehicle, it will serve a dual purpose; that is, as a luggage carrier and as a buffer, the luggage being within the view of the driver of the vehicle so that liability of its becoming lost will be reduced to a minimum, and on account of the inherent resiliency of the luggage carrier it will adequately serve as a buffer, as will be clearly apparent by reference to Fig. 1.

I prefer to notch the edges of the bars rather than drill holes through them for the bolts which secure the transverse slats because the operation of assembly is simplified and because the liability of the bars becoming weakened by drilling holes will be eliminated.

What I claim and desire to secure by Letters Patent is:

A luggage carrier for motor vehicles comprising spaced spring arms and slats connecting said arms, and means for attaching rear ends of said arms to a vehicle frame, the arms being curved between their ends to form a carrier and permit the arms to flex when impacted at their free ends.

In testimony whereof I affix my signature.

JOSEPH H. WITTMANN.